US010407176B2

(12) United States Patent
Meadows et al.

(10) Patent No.: US 10,407,176 B2
(45) Date of Patent: Sep. 10, 2019

(54) PRETENSIONER FOR RETRACTABLE SHOULDER BELT AND SEAT BELT

(71) Applicants: B/E Aerospace, Inc., Wellington, FL (US); Schroth Safety Products LLC, Pompano Beach, FL (US)

(72) Inventors: Benji Shane Meadows, Mt. Airy, NC (US); Randy Penley, Pfafftown, NC (US); Alen Wyss, Winston-Salem, NC (US); Michael P. Kurtzman, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/476,315

(22) Filed: Mar. 31, 2017

(65) Prior Publication Data
US 2017/0283079 A1 Oct. 5, 2017

Related U.S. Application Data

(60) Provisional application No. 62/316,062, filed on Mar. 31, 2016.

(51) Int. Cl.
*B64D 11/06* (2006.01)
*B64D 25/06* (2006.01)
*B64D 25/04* (2006.01)
*B60R 22/46* (2006.01)
*B60R 21/00* (2006.01)
*B60R 21/01* (2006.01)

(52) U.S. Cl.
CPC .......... *B64D 25/06* (2013.01); *B60R 22/4628* (2013.01); *B64D 11/062* (2014.12); *B64D 25/04* (2013.01); *B60R 2021/0093* (2013.01); *B60R 2021/01272* (2013.01); *B60R 2022/4642* (2013.01)

(58) Field of Classification Search
None
See application file for complete search history.

(56) References Cited

U.S. PATENT DOCUMENTS

| 7,401,815 | B2 * | 7/2008 | Clute | B60R 22/4619 180/268 |
| 2002/0149184 | A1 * | 10/2002 | Ertl | B60R 21/01554 280/733 |

(Continued)

*Primary Examiner* — Tamara L Weber
(74) *Attorney, Agent, or Firm* — Clements Bernard Walker PLLC

(57) ABSTRACT

In an illustrative embodiment, a seat is oriented at an oblique angle with respect to a centerline of an aircraft fuselage, the seat having an Aircraft Passenger Restraint System (APRS) with a pre-tensioner and integral retractable shoulder and seat belt webbing. In an illustrative example, the ARPS may be a three-point restraint to control a seat occupant's upper body, head and torso area. In some embodiments, the ARPS may further control the forces on the lower spine and torso. In some applications, the ARPS may operate to control the Head Injury Criteria (HIC) levels for the seat occupant's head, as well as the neck twist and upper spinal forces, to meet aircraft certification requirements imposed by the Federal Aviation Administration (FAA) and/or European Aviation Safety Agency (EASA). In response to a deceleration event, the ARPS may rapidly retract the belt webbing to substantially remove slack.

14 Claims, 8 Drawing Sheets

(56) References Cited

U.S. PATENT DOCUMENTS

| | | | |
|---|---|---|---|
| 2006/0253240 A1* | 11/2006 | Rao | B60W 50/0205 |
| | | | 701/48 |
| 2010/0324774 A1* | 12/2010 | Bouni | B60R 21/0152 |
| | | | 701/31.4 |
| 2014/0021771 A1* | 1/2014 | Meister | B64D 25/06 |
| | | | 297/483 |
| 2016/0046378 A1* | 2/2016 | Brandt | B64D 11/062 |
| | | | 244/122 B |
| 2016/0280171 A1* | 9/2016 | Moeller | B60R 21/18 |

* cited by examiner

PRETENSIONER FOR RETRACTABLE SHOULDER BELT AND SEAT BELT

RELATED APPLICATIONS

This application claims priority to U.S. Provisional Patent Application Ser. No. 62/316,062, entitled "Pretensioner with Integral Retractable Shoulder Belt and Seat Belt for Oblique-Mounted Aircraft Seats," filed Mar. 31, 2016, and herein incorporated by reference in its entirety. This application incorporates by reference, in its entirety, the following prior patent application by B/E Aerospace, Inc. directed to three-point passenger safety harnesses: U.S. patent application Ser. No. 15/205,563, entitled "Aircraft Passenger Restraint System with Three-Point Seat Belt and Structural Mounted Airbag," filed Jul. 8, 2016.

BACKGROUND

During the flight, the passengers and crew are generally confined to a cabin located above the cargo bay. During a typical flight on a passenger airline, each passenger may be required to remain temporarily in their seating location. Each seat may have safety features that are designed to protect the passenger. For example, each seat may be associated with a floatation device that the passenger can access in the event of a water landing. In various examples, the seat may include a seat belt that the passenger may be required to wear, at least during taxi, take off, and landing (TTOL). The seat belt may, for example, protect the passenger in the event of a sudden deceleration due, for example, to the aircraft impacting against a stationary object and/or sudden drop in altitude due to turbulent conditions.

Head Injury Criteria (HIC) requirements are provided, for example, by the Federal Aviation Administration (FAA) to establish standards in passenger protection in passenger aircraft cabin design. Certain HIC requirements are set forth in 14 CFR 23.562, which is incorporated herein by reference. The HIC requirements, for example, result in clearance requirements within a head impact zone to reduce likelihood of passenger concussion in the event of an emergency such as rapid deceleration. Further, the requirements specify a measurable HIC number resulting from, for example, a head impact against objects that are within the head impact zone of a passenger, such as a fore passenger seat or a partition. In this manner, should a passenger's head impact an object such as the forward backrest of the fore passenger seat, the force of the impact is absorbed at least in part through the backrest design.

In some aerospace safety testing applications, a head injury criteria (HIC) may be evaluated over the period when the head of the anthropomorphic test dummy (ATD) is in contact with any structure on the aircraft interior. Injury may be defined as any HIC value exceeding the threshold value of 1000. The HIC may be one of the injury criteria by the General Aviation Safety Panel (GASP) to be considered in the design and certification of aircraft seats and restraint systems.

Typical civilian aircraft passenger seats have historically been oriented facing forward in longitudinal alignment with the aircraft fuselage and passenger cabin. More recently, air carriers have begun installing "suites" in premium and business-class cabins. These suites may include a seat that lowers and extends into a sleeping surface, one or more tables, ottomans, electronics and storage compartments. Airlines may utilize the limited space in an aircraft cabin, by orienting seats at an angle oblique to the longitudinal axis of the aircraft cabin. This orientation allows seats to be staggered or aligned in the oblique angle. Seats may be angled toward or away from adjacent seats to permit ease of passenger interaction or to permit a degree of privacy to adjacent passengers by placing the passenger's normal field of view away from the adjacent passenger.

Standards bodies are developing testing and safety standards associated with passengers who will not be seated forward in an emergency. Proposed standards, for example, are provided in the "Performance Standards for Oblique Facing Passenger Seats in Transport Aircraft" by the Aircraft Seat Committee, International, developed Dec. 14, 2016 and pending FAA and EASA approval prior to publication, which is herein incorporated by reference in its entirety. The Federal Aviation Administration (FAA) has issued a circular entitled "Dynamic Evaluation of Seat Restraint Systems and Occupant Protection on Transport Airplanes," Advisory Circular AC 25-562, dated Jan. 10, 2006, which is also incorporated herein in its entirety.

SUMMARY OF ILLUSTRATIVE EMBODIMENTS

Apparatus and associated methods relate to a seat, preferably oriented at an oblique angle with respect to a centerline of an aircraft fuselage, the seat having an Aircraft Passenger Restraint System (APRS) with a pre-tensioner and integral retractable shoulder and seat belt webbing. In an illustrative example, the ARPS may be a three-point restraint to control a seat occupant's upper body, head and torso area. In some embodiments, the ARPS may further control the forces on the lower spine and torso. In some applications, the ARPS may operate to control the Head Injury Criteria (HIC) levels for the seat occupant's head, as well as the neck twist and upper spinal forces, to meet aircraft certification requirements imposed by the Federal Aviation Administration (FAA) and/or European Aviation Safety Agency (EASA). In response to a deceleration signal, the ARPS may, for example, rapidly retract the belt webbing to substantially remove slack.

Various embodiments may achieve one or more advantages during a deceleration event for passengers seated in oblique-mounted seating arrangements. For example, some embodiments may apply a retracting force of a predetermined value to a lap belt and/or a shoulder belt. The retracting force may control a passenger's upper body, head, torso, lower spine and lower torso. In some embodiments, the retracting force may control the HIC levels for the passenger's head, as well as the neck twist and upper spinal forces. Some embodiments may meet aircraft certification requirements imposed by the FAA and/or the EASA.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
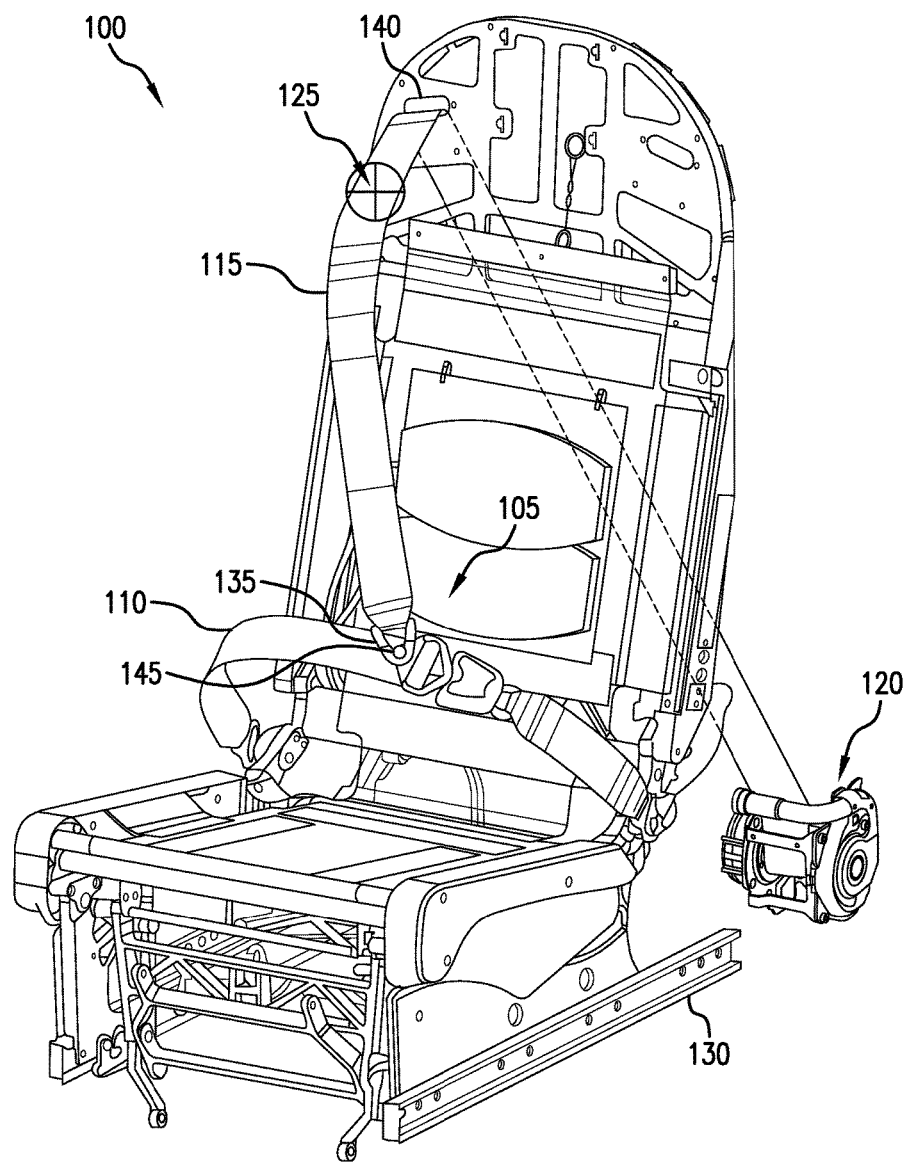
FIG. 1 depicts a front perspective view of an exemplary obliquely-mounted aircraft passenger restraint system (APRS)

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 depicts a front perspective view of an exemplary obliquely-mounted aircraft passenger restraint system (APRS). An APRS seat 100 includes a three-point restraint harness 105. The three-point restraint harness 105 includes a lap belt 110 and a shoulder belt 115. The lap belt 110 is fixedly coupled to the APRS seat 100. The front side of the shoulder belt 115 is swivelably coupled to the lap belt 110. The rear side of the shoulder belt 115 is fed through a slot on the APRS seat 100. The shoulder belt 115 continues behind the APRS seat 100 where it is coupled to a rear-mounted pretensioner 120. For testing, the shoulder strap may include an integrated load cell 125. The APRS seat 100 is fixedly attached to a track stud 130.

The APRS seat 100 includes the three-point restraint harness 105 which includes the lap belt 110 coupled to the frame of the APRS seat 100. The shoulder belt 115 includes a bracket with a keyhole slot 135 on the forward end of the shoulder belt 115 that may permit a releasable attachment to an anchor point 145 on the lap belt 110. In some embodiments, both the lap belt 110 and the shoulder belt 115 are constructed of heavy-duty webbing, having a major dimension (e.g., width) and a minor dimension (e.g., thickness), and may be of a type conventionally employed in aircraft seating. The shoulder belt 115 extends through a shoulder belt slot 140 in the upper end of the back of the APRS seat 100. The shoulder belt 115 extends diagonally from the shoulder belt slot 140 to the anchor point 145 on the lap belt. The lap belt 110 and the shoulder belt 115 together form the three-point restraint harness 105.

In some examples, the position of the shoulder belt 115 in the shoulder belt slot 140 may depend on the direction of the seat mounting angle in relation to the longitudinal axis of the aircraft cabin. The APRS seat 100 may provide a shoulder belt slot 140 on the adjacent side to accommodate a mirror image embodiment.

In an illustrative example, a rearward end of the shoulder belt 115 may extend down the back side of the APRS seat 100 and may be coupled to the active pretensioner 120. In the event of a sudden deceleration of the aircraft, the active pretensioner may rapidly retract the shoulder belt 115 to substantially remove slack between a passenger and the shoulder belt 115, which action may advantageously provide a reduction in space between the shoulder belt 115 and the passenger, and/or between the passenger and the APRS seat 100 and may safely secure the passenger in the APRS seat 100.

In some embodiments, the shoulder belt 115 utilizes a retractable belt mechanism, such as the pretensioner 120, that limits the amount the shoulder belt 115 will unwind, or slack, during a deceleration event. The retractable shoulder belt 115 may control the movement of a seat occupant's upper body and may reduce the loads to the lower spine sufficiently to meet oblique-seat certification requirements.

In some examples, the performance combination of the pretensioner 120 and the three-point restraint harness 105 may control the passenger's upper neck, head, and lower torso loads and may reduce the passenger's Head Injury Criteria (HIC) values. In some examples, the APRS seat 100 may lower the passenger's injury loads to levels that may achieve Federal Aviation Administration (FAA) and/or European Aviation Safety Agency (EASA) certification for obliquely-mounted aircraft seats.

In some implementations, the angle of the slot 140 with respect to a plane of the floor, for example, may be substantially orthogonal to an expected angle of entry when the shoulder belt 115 is encompassing a passenger.

In some applications, the angle of the slot may be made adjustable so as to adjust to the angle of incidence of the shoulder belt 115 with respect to the slot 140. For example, a swivel guide may be pivotably coupled at a point slightly above the slot 140 and centrally located with respect to a major dimension of the slot 140. Depending from the pivot point may be a roller or low friction guide, such as a polished aluminum or low friction plastic bar or channel guide, for example. As the shoulder belt 115 is extracted and retracted through the slot from different angles as a result of passenger displacement, the swivel guide can adjust its angle in the slot 140.

In some implementations, a low friction mechanism is employed in the slot 140 to substantially mitigate abrasion of the webbing of the shoulder belt 140 due to extraction and retraction in the slot 140. In an illustrative embodiment, a plastic or metal roller may maintain at least a minimal separation between the webbing and an inner edge of the slot 140.

In some implementations, the pretensioner 120 is disposed directly behind the seat back with the slot 140. For example, the pretensioner 120 may be incorporated into an upper portion of the seat back. In some embodiments, the pretensioner 120 is integrated into a cushion and/or the frame structure of the upper seat back itself.

The pretensioner 120 is housed below the seat pan, in some embodiments. The shoulder belt 115 may extend downwardly from the slot 140 behind the frame of the seat back, and to the pretensioner 120 fixedly attached, for example, to a base of the seat. In some embodiments, the pretensioner 120 is mounted, either directly or indirectly through a frame member, to a seating connection track 130, for example.

Figure 2:
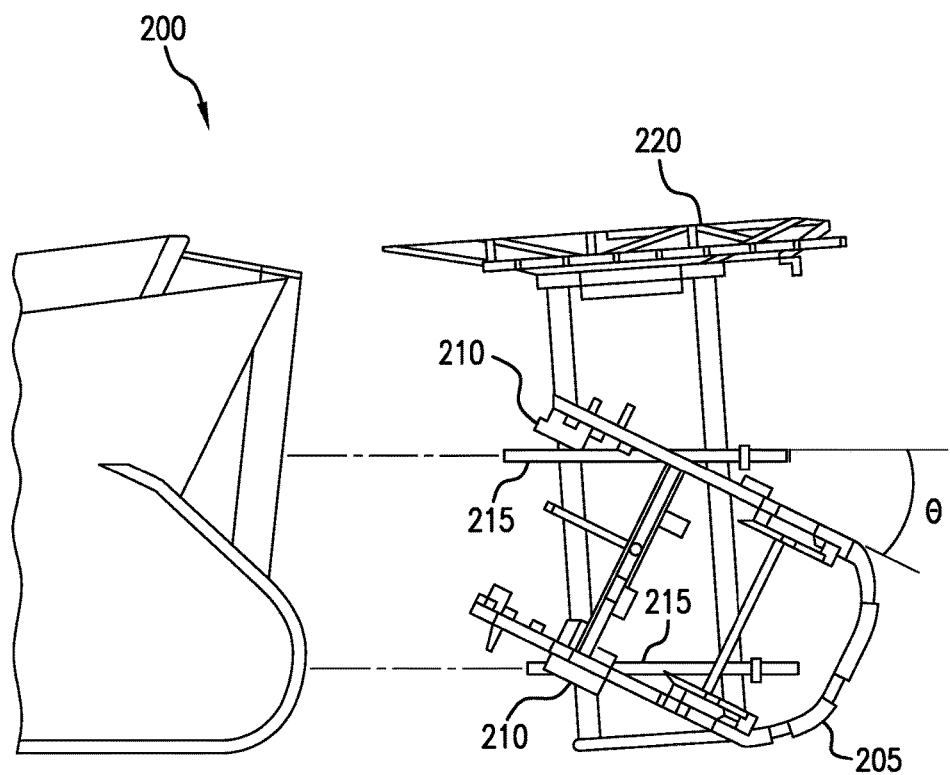
FIG. 2 depicts a top plan view of an exemplary obliquely-mounted test seat to determine Head Injury Criteria (HIC) values.

FIG. 2 depicts a top plan view of an exemplary obliquely-mounted test seat to determine HIC values. An obliquely-mounted test seat 200 includes a passenger seat frame 205. The passenger seat frame 205 is obliquely-mounted, in an illustrative example, at 26°, offset from the longitudinal axis of an aircraft cabin. In other examples, the passenger seat frame 205 may be offset from the longitudinal axis of the aircraft cabin by an angle from about 15 to 80 degrees, or by an angle greater than 18 and less than 45 degrees. The passenger seat frame 205 is fixedly coupled to a track fitting 210. The track fitting 210 is fixedly coupled to a floor mounting track stud 215. The track stud 215 is fixedly coupled to supports that represent, in the test fixture, the floor attachment points of the aircraft cabin. The aircraft cabin is fixedly attached to an outboard side console support 220. The passenger seat frame 205 is in a fixed relationship to the track fittings 210 and the track studs 215. The outboard side console support 220 is forward of the passenger seat frame 205.

In some embodiments, relative distance movements of deformation points positioned on a passenger seat as well as surrounding suite structures are monitored during testing.

Figure 3:
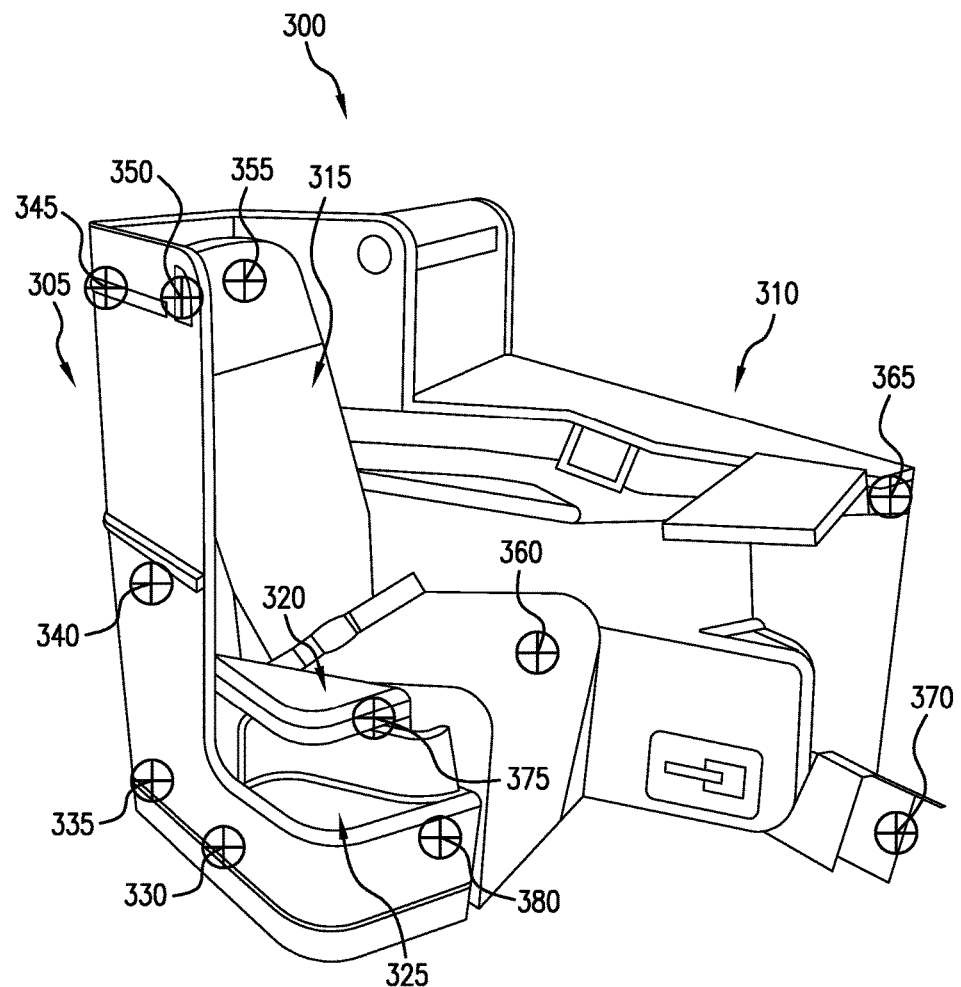
FIG. 3 depicts a front, rear-facing perspective view of an exemplary obliquely-mounted test seat illustrating the location of deformation points.

FIG. 3 depicts a front, perspective view of an exemplary obliquely-mounted test seat illustrating the location of deformation points for use in testing. In various examples, the structures described in FIG. 3 may be referred to as monuments or pods, for example. Seating monuments may include one or more passenger seats such as the passenger seat 315. As illustrated in FIG. 3, a cabin interior monument 300 includes an outer shell 305. The outer shell 305 is fixedly coupled to a console structure 310. The console structure 310 is adjacent to an obliquely-mounted passenger seat 315. The passenger seat 315 is adjacent to an armrest 320. The armrest 320 is slidably coupled on top of an endbay 325. The outer shell 305 includes beam deformation points 330 and 335. The outer shell 305 includes a "25-inch above seat-track" deformation point 340. The outer shell 305 includes top of shell deformation points 345 and 350. The passenger seat 315 includes deformation points 355 and 360. The console structure 310 includes deformation points 365 and 370. The armrest 320 includes deformation point 375. The endbay 325 includes deformation point 380. In a specific example, the deformation points 355 and 360 represent points on the seat that may be used to measure distances for the pre-test and post-test conditions.

The seat of FIGS. 1-5 meets the following performance criteria. The distance between deformation point 355 and the front of the seat 360 after the test is at least 50% of the distance between those points prior to the test. Forward and rearward deformations of the seat do not exceed 75 mm. The seat bottom rotational permanent deformation does not result in an angle that exceeds 20 degrees pitch down or 35 degrees pitch up from the horizontal plane. This rotational deformation is measured between the fore and aft extremities of the seat pan at the centerline of each seat bottom (see FIG. A2-3 of the FAA circular entitled Dynamic Evaluation of Seat Restrain Systems). The deformed seat does not encroach more than 1.5 inches (38 mm) into the required longitudinal aisle space at heights up to 25 inches (635 mm) above the floor. The deformed seat does not encroach more than 2.0 inches (50 mm) into the longitudinal aisle space at heights 25 inches (635 mm) or more above the floor. The deformed seat does not encroach more than 1.5 inches (38 mm) into any cross-aisle or flight attendant assist space.

The deformation points, in some embodiments, depend in part upon various amenities built into the passenger seating monument. For example, each typical aircraft amenity, such as tray tables and display monitors, may react differently due to event forces when mounted at an oblique angle aligned relative to the obliquely-mounted passenger seat. As such, test conditions may include testing impact force events for a variety of suite features in addition to effects on the passenger seated in the obliquely angled passenger seat.

The console structure 310, in some examples, may incorporate various power outlets, for example, one or more USB ports or three-prong electrical ports. In some examples, the console structure 310 may provide for wireless charging surfaces, which may advantageously allow a passenger to charge a personal electronic device by merely placing the device on the charging surface within the console structure 310. In some embodiments, the console structure 310 may provide a personal electronic device holder, and may advantageously provide a hands-free method for manipulating and/or viewing a personal electronic device. The console structure 310 may also, in some examples, provide various embossed features, for example, circular cup holders, personal electronic device holders, coin and/or eyeglass holders, and the like. The console structure 310 may also, in some examples, provide various environmental controls, for example, ventilation flow rate and/or temperature control(s). The console structure 310, in various embodiments, may be padded, which may advantageously provide the passenger additional armrest areas. A tray table may be provided in certain embodiments, and maybe stowable and supported by the console structure 310. Such a tray table may articulate into a vertical position and then slide down into a hidden pocket within the console structure 310. In some embodiments, such a tray table may fold out into a larger table. In some embodiments, controls may be provided on the console structure 310 to change channels or adjust volume related to a personal video monitor. In some embodiments, such controls may include a flight attendant call button. Various embodiments may include open areas within the console structure 310 which may advantageously provide a place for a passenger to gain additional space for their feet or legs, for example. Cabin designers may find benefit in various embodiments that may employ stowage for safety items within the console structure 310, for example, inflatable vests. In some embodiments, the console structure 310 may advantageously provide a literature holder.

In some embodiments, the outer shell 305 incorporates a kick area where it meets a cabin floor. The kick area may allow for additional foot space for passengers passing by. In some examples, the outer shell 305 may tilt rearward in the top section, which may advantageously provide additional reclining angle for the passenger. Space between the passenger seat 315 and the outer shell 305 may beneficially be utilized for storage of items such as pillows, for example. In some embodiments, the upper portion of the outer shell 305 facing a passenger may be padded, such that a passenger may optionally rest their head on the padded outer shell 305.

In some embodiments, the passenger seat 315 incorporates one or more force sensors. The force sensors may communicate with a headend computer or other processing circuitry on board the aircraft. Passengers and/or crew members may find benefit in electronically determining passenger seating status. In some examples, aircraft passenger restraint systems may contain sensors and may communicate with onboard computers, which may advantageously allow crew members to determine passenger restraint status. In some embodiments, the outer shell 305 in conjunction with the passenger seat 315 may provide an under-seat stowage area, advantageously allowing passengers to stow carry-on items. The passenger seat 315 may include a headrest, in some examples. In some embodiments, the headrest may be articulating, which may advantageously provide passengers a comfortable resting position.

In various examples, the armrest 320 may provide for an articulation lock button, and may allow the armrest 320 to articulate up and down while pressed, and may advantageously adjust for passenger elbow height. The articulation lock button when released may lock the armrest 320 into its current position. In some examples, the armrest 320 may act as a compartment cover for the endbay 325 which may advantageously allow a passenger to temporarily store personal items such as a personal electronic device while the passenger visits the lavatory or is sleeping, for example.

Figure 4:
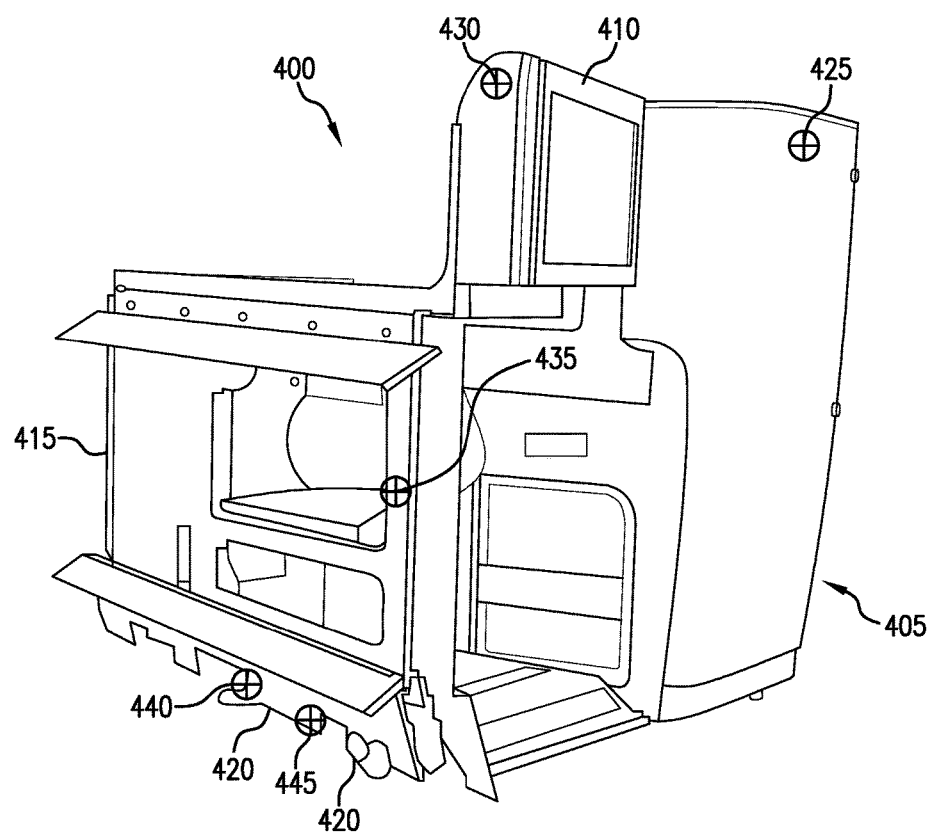
FIG. 4 depicts a rear, front-facing perspective view of an exemplary obliquely-mounted aircraft monument illustrating the location of deformation points.

FIG. 4 depicts a rear, front-facing perspective view of an exemplary obliquely-mounted aircraft monument illustrating the location of deformation points. A cabin interior monument 400 includes an outer shell structure 405. The outer shell structure 405 is coupled to the top of a monitor 410. The outer shell structure 405 is coupled to a console structure 415. Incorporated into the console structure 415 are console beams 420. The outer shell structure 405 includes a shell deformation point 425. The monitor 410 includes a monitor deformation point 430. The console structure 415 includes a console deformation point 435. The console beams 420 include beam deformation points 440 and 445.

In some examples, the outer shell structure 405 may include a foot rest which may advantageously allow a passenger to recline more comfortably. In various embodiments, various floor structures within the monument 400 may articulate vertically which may advantageously provide a more comfortable leg position for the passenger.

In some embodiments, the monitor 410 may articulate, for example, the monitor may tilt up and down and/or side to side, and may advantageously allow the passenger to improve the viewing angle. In some examples, the monitor may articulate toward or away from the passenger, which may advantageously improve monitor viewability, or may advantageously provide more room to exit the monument 400. In some embodiments, the frame of the monitor may be padded, which may advantageously reduce the risk of passenger injury. In some examples, the monitor may articulate into a stowage position, for example, sliding upward or pivoting into a horizontal position.

Figure 5:
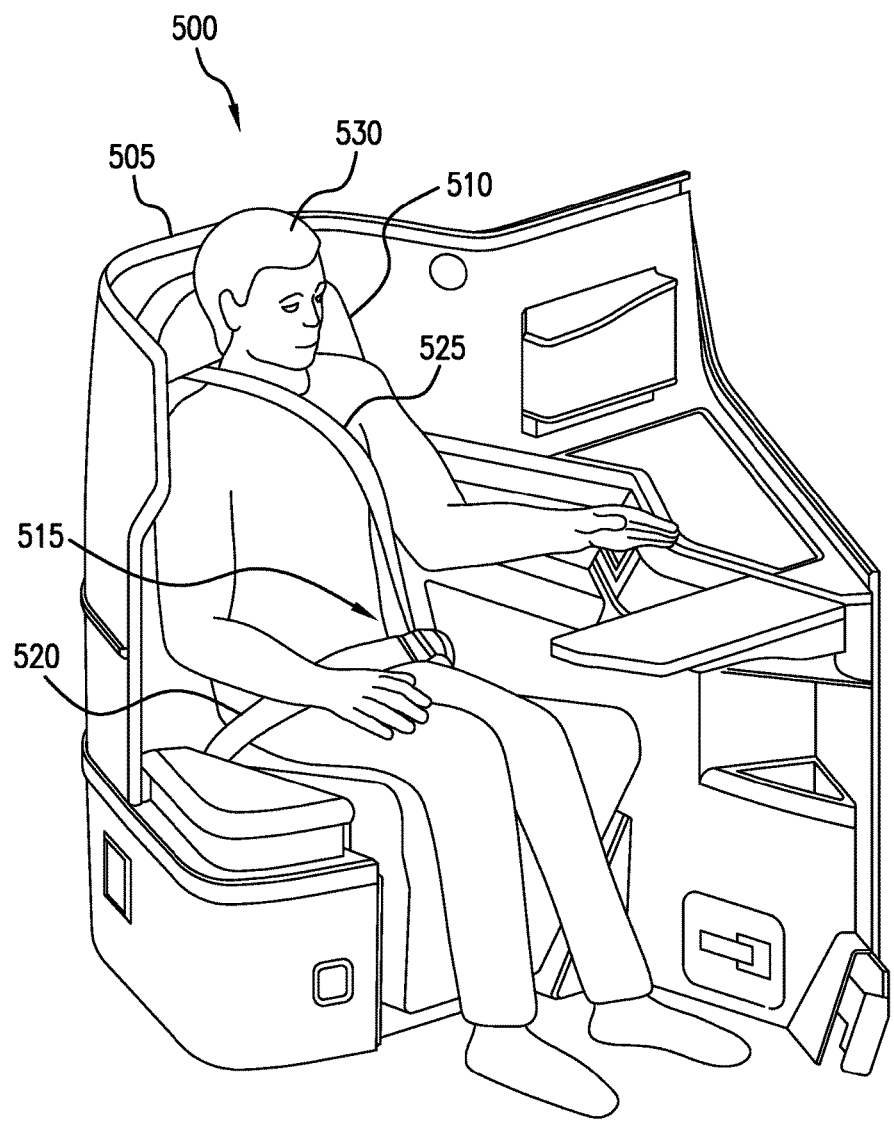
FIG. 5 depicts a front perspective view of an exemplary obliquely-mounted aircraft seating unit and restraint system employed by a passenger.

FIG. 5 depicts a front perspective view of an exemplary obliquely-mounted aircraft seating unit and restraint system employed by a passenger. An aircraft seating unit 500 includes a cabin shell 505. The cabin shell 505 partially surrounds a passenger seat 510. The passenger seat 510 includes a three-point harness 515. The three-point harness 515 includes a lap belt 520 and a shoulder strap 525. The lap belt 520 and the shoulder strap 525 secure a passenger 530 to the passenger seat 510.

In various embodiments, certain amenity options may be provided within the aircraft seating unit 500, for example, a facial tissue holder. In some examples, the amenity options may include various dispensers for individually packed personal items such as wet napkins. Airlines may find benefit in various embodiments that dispense certain items found useful by passengers 530, and that additionally provide advertisement for manufacturers of the items dispensed, by collecting advertisement fees from such manufacturers. In some embodiments, the cabin shell 505 may extend substantially to the ceiling of the aircraft cabin, which may advantageously provide more passenger privacy. In some embodiments, the cabin shell 505 may include various indicators, for example, a flight attendant call lamp. In some examples, various indicator lamps may provide the flight crew with passenger's seating and/or restraint status.

Figure 6:
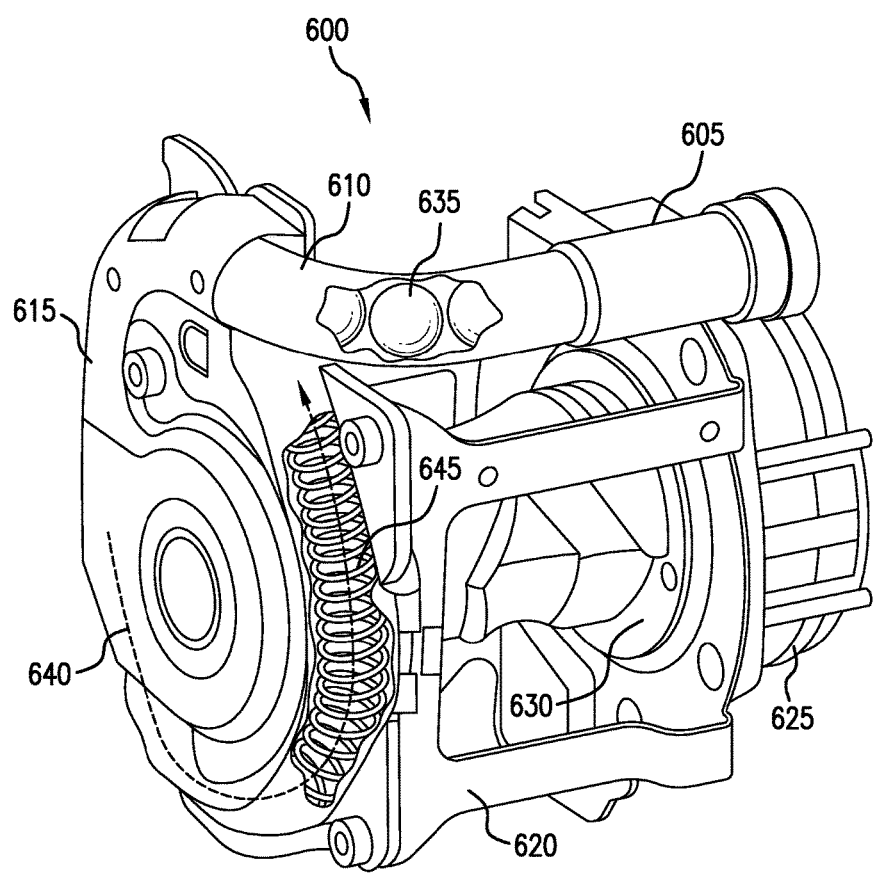
FIG. 6 depicts a perspective view of an exemplary retractor pretensioner.

FIG. 6 depicts a perspective view of an exemplary retractor pretensioner 600 including a micro-gas generator 605. The micro-gas generator (MGG) 605 may have one of the structures described in U.S. Patent Application Publication 2006/0162607, entitled "Micro Gas Generator with Automatic Ignition Function," which is incorporated herein in its entirety.

The MGG is removably coupled to a ball bearing guide tube 610. The ball bearing guide tube 610 is fixedly coupled to a mechanical ball bearing roundabout 615. The ball bearing roundabout 615 is fixedly coupled to a pretensioner frame 620. The pretensioner frame 620 is fixedly coupled to a mechanical side 625. The ball bearing roundabout 615 and the spring-loaded mechanical retractor 625 are rotatably coupled to opposite sides of a webbing reel 630. The ball bearing guide tube 610 contains one or more internal ball bearings 635.

In an illustrative example, the ball bearings 635 may be propelled by the micro-gas generator 605 along a ball bearing channel 640. The ball bearings 635 may be propelled through the ball bearing guide tube 610. The ball bearings 635 may continue from the ball bearing guide tube 610 to the ball bearing roundabout 615. Within the ball bearing roundabout 615, the ball bearings 635 may interface with correspondingly shaped cogs 745 on wheel 740 which is integrated into the webbing reel 630. As the ball bearings advance under the force exerted by the MGG the wheel 740 turns in the belt-tightening direction. The integrated webbing reel 630 may be propelled in a rotation about its longitudinal axis. After actuation of the MGG, an inertial pawl in the retractor 625 (not shown) prevents spool from turning in the belt-loosening direction until the pawl is released by providing slack on the belt which in turns allows the wheel 740 to turn further in the belt-tightening direction thereby releasing the inertial pawl.

In some examples, the webbing reel 630 may be fixedly attached to restraint webbing within a three-point harness. In such examples, the retractor pretensioner 600 may take up the slack within the three-point harness. In one alternative embodiment, the retractor pretensioner 600 is attached to the shoulder belt 115. In another alternative embodiment, the retractor is coupled to the lap belt 115. In that embodiment, the retractor may be coupled to the lap belt 115 on either side of the buckle (i.e., coupled to the strap bearing the male buckle connector or the strap bearing the female buckle connector). Still further, multiple retractors may be used, each being coupled to one of the foregoing belts/straps.

In some embodiments, the retractor pretensioner 600 includes the pretensioner frame 620, on which may be mounted a ratchet assembly which may be driven by a spool, also mounted in the pretensioner frame 620. A shoulder belt and/or lap belt may be attached to the spool in an orientation allowing the shoulder belt and/or lap belt to loosen when the spool is rotated in one direction and to tighten when the spool is rotated in the opposite direction. A pyrotechnic pretensioner may be attached to the frame and may drive the rotation of the spool around its longitudinal axis.

In some embodiments, the retractor pretensioner 600 is mounted on an aircraft seat frame behind a passenger seat. In some examples, the retractor pretensioner 600 may be mounted on the aircraft seating cabin floor. In some instances, the rearward end of a shoulder belt and/or a lap belt may be attached to the retractor pretensioner 600. In the event of an emergency deceleration event, an incipient increase in tension on a shoulder belt and/or a lap belt may instantly trigger the micro-gas generator 605 which may generate a gas. The gas may drive one or more ball bearings 635 in the retractor pretensioner 600 around the ball bearing guide tube 610. The ball bearings 635 within the ball bearing guide tube 610 may drive the webbing reel 630 in the belt-tightening direction, removing the slack in the shoulder belt and/or lap belt. This tightening may slow and restrict forward movement of a seat occupant.

Figure 7:
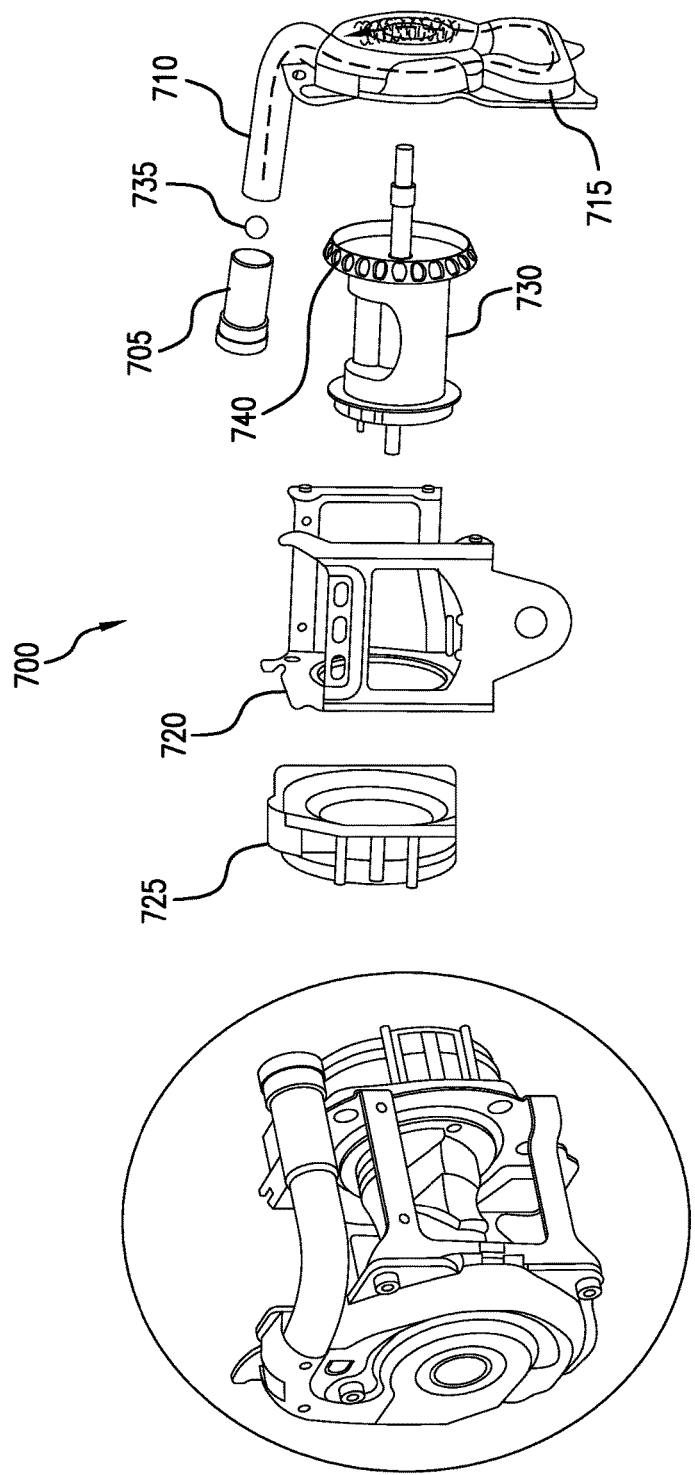
FIG. 7 depicts a perspective view and exploded view of an exemplary belt retractor; and, FIG. 8 depicts a cross-sectional view of two exemplary micro-gas generators.

FIG. 7 depicts a perspective view and exploded view of an exemplary belt retractor 700 including a micro-gas generator 705. The micro-gas generator 705 is removably coupled to a ball bearing guide tube 710. The ball bearing guide tube 710 is fixedly coupled to a pyrotechnical pretensioner 715. The pyrotechnical pretensioner 715 is fixedly coupled to a frame 720. The frame 720 is fixedly coupled to a mechanical end cap 725. The pyrotechnical pretensioner 715 and the mechanical end cap 725 are rotatably coupled to opposite sides of a belt spool 730. The ball bearing guide 710 contains one or more internal ball bearings 735. In some examples, when the ball bearings 735 are propelled through the ball bearing guide tube 710, the ball bearings 735 interface with a cogwheel 740 integrated onto the belt spool 730. This action of the ball bearings 735 with the cogwheel 740 may drive the belt spool 730 around its axis and may control the active length of a passenger's three-point safety harness. In operation, the arrows illustrate the ball bearing 735 flow path. The ball bearings interface with the cogs on the wheel 740 and force the spool to turn in the belt-tightening direction.

The ball bearing channel 640 may include a spring member 645. The spring member 645 keeps the ball bearings 635 pressed against one another prior to triggering of the MGG. Upon triggering of the MGG, the expanding gas forces the ball bears down the channel 640 by overcoming the force of the spring member 645. The spring member preferably provides sufficient travel for the spool 630 to turn enough in the belt tightening direction to take up any slack in the belt or strap. Alternatively, the ball bearings may be biased in place by a torsional spring coupled to a moving flange or receiver that travels with the ball bearing having the position furthest along the bearing channel.

Figure 8:
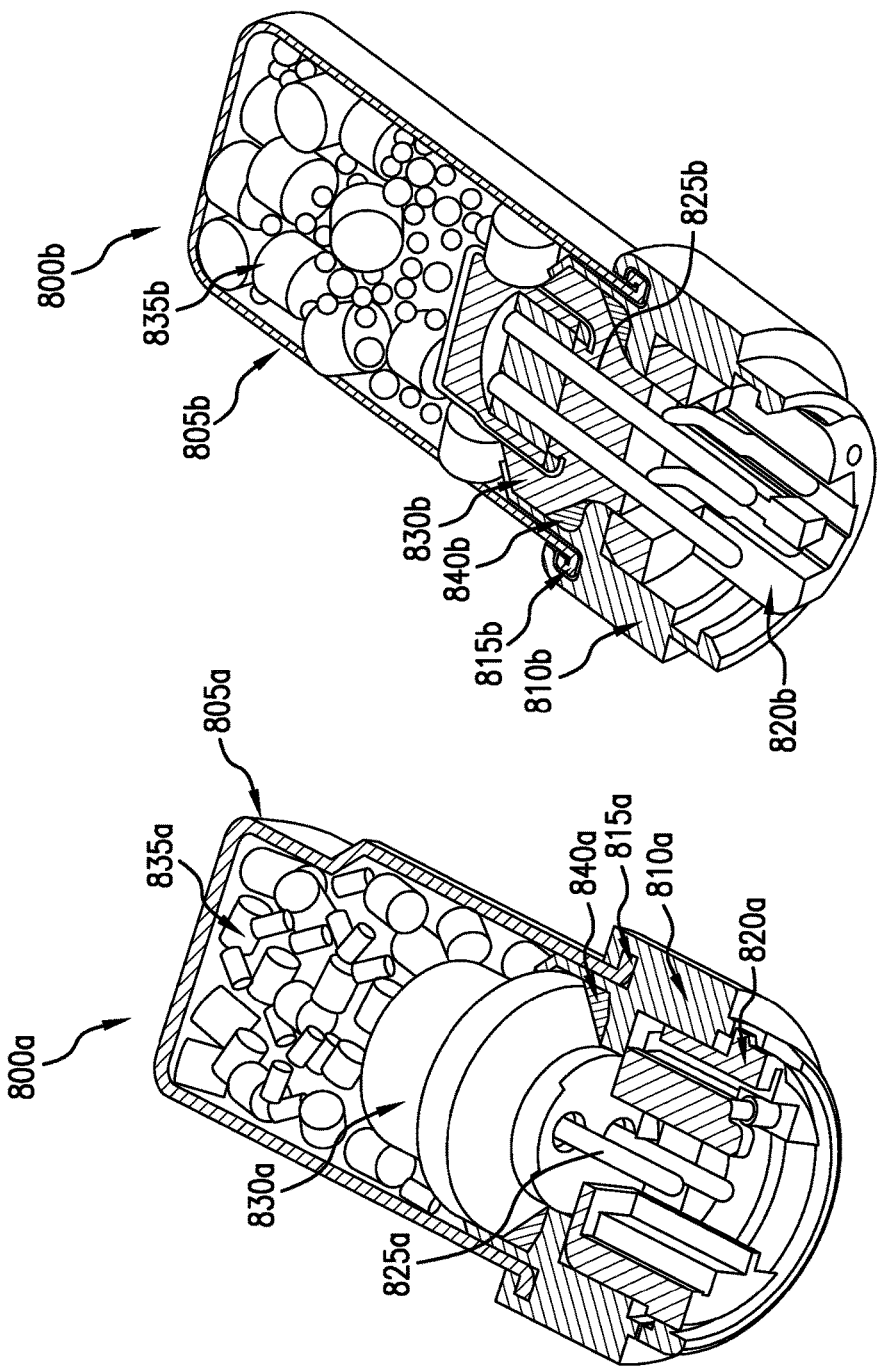

FIG. 8 depicts a cross-sectional view of two exemplary micro-gas generators. A micro-gas generator 800a includes an enclosure case 805a. The enclosure case 805a is coupled to a squib holder 810a via a sealant 815a. The squib holder 810a is coupled to a shunt ring 820a. The shunt ring 820a includes an aperture for a pair of electrical leads 825a. The pair of electrical leads 825a are fixedly attached to an initiator 830a. The initiator 830a is adjacent to a pyrotechnic powder 835a. The pyrotechnic powder 835a is protected from moisture and other contaminants by an O-ring 840a and is confined within the enclosure case 805a.

A micro-gas generator 805b includes an enclosure case 805b. The enclosure case 805b is coupled to a squib holder 810b via a sealant 815b. The squib holder 810b is coupled to a shunt ring 820b. The shunt ring 820b includes an aperture for a pair of electrical leads 825b. The pair of electrical leads 825b are fixedly attached to an initiator 830b. The initiator 830b is adjacent to a pyrotechnic powder 835b. The pyrotechnic powder 835b is protected from moisture and other contaminants by an O-ring 840b and is confined within the enclosure case 805b.

In an illustrative example, when ignited by the initiator 830a and 830b the powder may instantly generate a gas which may propel an array of ball bearings, confined in a ball bearing race, in a circular direction, rotating a pretensioner spool and tightening a shoulder and/or a lap belt.

In some implementations, Head Injury Criteria (HIC) is evaluated over the period when the head of an Anthropomorphic Test Dummy (ATD) is in contact with any structure on the aircraft interior. Injury may be defined as any HIC value exceeding the threshold value of 1000.

Table A illustrates experimental test data representing exemplary performance criteria. The experimental test was carried out on an exemplary embodiment. The data demonstrated compliance with applicable Federal Aviation Administration (FAA) certification requirements. The experimental tests were carried out on a single passenger ATD Hybrid III 50%. The Hybrid III consists of a family of ATDs including a mid-sized adult male (50 percentile). The exemplary embodiment was equipped with a pretensioner as part of the shoulder harness, without an airbag, as depicted in FIG. 1. The exemplary embodiment was also configured as shown in FIG. 2, where the seat was installed at an oblique angle θ, measured from a longitudinal axis of the aircraft fuselage.

Based on the test data, as shown in table A, the exemplary performance criteria for HIC may range from about 100 to about 600. The experimental test data indicated that the restraint system is operable to an HIC of about 460 during a deceleration event, when the seat is placed at an oblique angle θ of about 26° with respect to the longitudinal fuselage axis.

Based on the test data, as shown in table A, the exemplary performance criteria for HIC Trimmed (0 ms-300 ms) may range from about 100 to about 600. The experimental test data indicated that the restraint system is operable to an HIC Trimmed (0 ms-300 ms) of about 460 during a deceleration event, when the seat is placed at an oblique angle θ of about 26° with respect to the longitudinal fuselage axis.

Based on the test data, as shown in table A, the exemplary performance criteria for Femur Compression may range from about 20 pounds to about 60 pounds. The experimental test data indicated that the restraint system is operable to Femur Compression of about 37.5 pounds during a deceleration event, when the seat is placed at an oblique angle θ of about 26° with respect to the longitudinal fuselage axis.

Based on the test data, as shown in table A, the exemplary performance criteria for Lumbar Spine Force may range from about 250 pounds to about 450 pounds. The experimental test data indicated that the restraint system is operable to Lumbar Spine Force of about 360 pounds during a deceleration event, when the seat is placed at an oblique angle θ of about 26° with respect to the longitudinal fuselage axis.

TABLE A

| Sled and ATD Criteria | Value | Units | Limit | Start Time | End Time |
|---|---|---|---|---|---|
| Peaks Sled | 16.21 | g | >16 | | |
| Rise Time | 89.0 | ms | <90 | t1 = 1.3 ms | t2 = 90.3 ms |
| Vtotal | 45.10 | ft/sec | >44 | t3 = 91.3 ms | t4 = 162.3 ms |
| Vrt | 23.21 | ft/sec | >22 | | |
| ATD: DU8610 Single pax, Hybrid III 50% | | | | | |
| HIC | 459.7 | n/a | <1000 | 92.3 ms | 318.4 ms |
| HIC trimmed 0 ms-300 ms | 457.4 | n/a | <1000 | 92.4 ms | 300 ms |
| Femur compression left | 40.67 | lb | <2250 | | |
| Femur compression right | 34.91 | lb | <2250 | | |
| Lumbar spine force | 358.55 | lb | <1500 | | |

Although various embodiments have been described with reference to the figures, other embodiments are possible. For example, in some embodiments, an aircraft passenger seat may be adapted for positioning on an aircraft deck at an oblique angle to the longitudinal axis of an aircraft cabin. The seat may include a seat frame on which is mounted a seat bottom and seat back. A lap belt may be attached to the seat frame and may be adapted to extend from one side of the seat bottom to the other side. This configuration may advantageously provide restraint to the abdominal region of a seat occupant. A shoulder belt may be mounted on the seat frame and may be adapted to extend diagonally across the upper torso of the seat occupant for releasable attachment to the lap belt. A retractor pretensioner may be operably coupled to at least one of the lap belts or the shoulder belt and may apply a retracting force of a predetermined value to the lap belt and/or the shoulder belt, upon a deceleration event of the aircraft. A rapid deceleration event, for example, may be identified when the aircraft cabin experiences a deceleration above an emergency deceleration threshold. The emergency deceleration threshold can correspond, in some examples, to a deceleration generated by a forced landing or turbulences and can be between 5 g-force (G) and 20 G, and particularly between 7 G and 13 G, and in some embodiments around 9 G.

In various examples, a vertical plane of symmetry that bisects the seat back of an ARPS configured seat, such as the one shown in FIG. 1, may intersect a longitudinal centerline of an aircraft fuselage at a predetermined angle. By way of example, and not necessarily limitation, the predetermined angle of such intersection may be, for example, about 26 degrees, such as between about 24 and about 28 degrees, or between about 22 and 30 degrees, or such as between about 20 degrees and about 32 degrees. In some examples, the seats may be substantially oriented to be aft-facing.

In some embodiments, a controller may have different triggering criteria or thresholds for activating a forward-facing ARPS configured seat and a nearby aft-facing ARPS configured seat, in order to optimize protection of the passenger in each individual seat. The controller, for example, may include processing circuitry, an input interface for receiving information regarding a rapid deceleration event, and an output interface for triggering pretensioner activation based upon detection of a rapid deceleration event. Threshold information, tables for responding to threshold deceleration events, and/or algorithms for responding to threshold deceleration events may be stored in a non-transitory computer readable medium included in or in communication with the processing circuitry. The processing circuitry, for example, may be a controller local to a passenger suite, passenger seating grouping, or cabin region. In another example, the processing circuitry may be provided as part of a an aircraft main computing system. The input communications may be wired or wirelessly received from inertial sensors such as gyroscopic sensors, in one example. The output communications may be wired or wirelessly transmitted to the passenger seat pretensioner module. In some embodiments, at least a portion of the processing circuitry is local to the pretensioner module.

An angle of recline sensor may be provided, in some embodiments, to detect a current recline angle of the seat. In the event of a large deceleration, a controller operatively coupled to the ARPS system may automatically modulate a timing or amplitude of the pretensioning action of, for example, the pretensioner 120 of FIG. 1. In an illustrative example, an ARPS configured passenger suite may have recline and/or weight sensing capabilities to determine the position, weight, body type, and recline angle, for example, of a passenger. In accordance with a predetermined algorithm that may be stored in a data store on a controller, the timing of the pretensioning action may be advanced or retarded from a nominal timing if the passenger is determined to be, for example, a small child. In another example, a large adult male who is fully reclined may be best protected by predetermined advance or delay in the timing of the pretensioning action.

In some embodiments, the controller that is operatively coupled to control the pretensioner module 120, for example, may further be configured to adapt a triggering condition for firing the pretensioner. For example, when a small child is detected by weight sensors (e.g., strain gauges, displacement sensors) in the seat, then the triggering requirements for pretensioning may be different than a full-size adult. The predetermined triggering requirements may be further made to be a function of the angle of recline. In some implementations, an array of sensors in the seat back, seat bottom, alone or in combination with sensors in the armrest and/or footrest, for example, may detect a body position of the seat occupant. In some examples, the body position information may be provided to the controller for adjusting the pretensioning command signal (e.g., timing, amplitude). In some examples, the pretensioning command may include a command to not initiate pretensioning.

In some embodiments, the triggering criteria for activating a pretensioner module may be defined by a predetermined envelope of one or more signals. For example, a deceleration profile (e.g., in longitudinal and/or lateral axes) may need to fall within a predetermined envelope over a period of time in order to trigger the pretension module. If an errant signal does not meet the predetermined envelope criteria, then the controller does not initiate a pretensioning. Qualifying the detection signals with, for example, complex temporal envelope criteria, alone or in combination with simple thresholds, may advantageously increase the accuracy of responding to proper sensor signals, and may reduce the probability of unnecessary pretension actions.

In some implementations, a master pretension signal, alone or in combination with a local controller generating a local pretension signal, may originate from a central processor, such as the cockpit flight control system, for example. The ARPS configured seats may be networked and in operative communication with the central computer, and in response to a master pretension signal, may initiate pretensioning.

In some embodiments, each seat may be individually addressable by the central processor. In the event of an object impact, sensors arranged around the aircraft may detect decelerations at a number of locations. The central processor may compute, in real time, an optimal pretensioning timing and/or amplitude for each addressable seat, and generate customized, independent pretensioning commands (e.g., amplitude, timing) optimized to minimize injury to each passenger at each ARPS-configured seat. In an illustrative example, the central processor, which itself could become damaged during the event, may issue updated commands of amplitude and delay to each addressable seat. At each controller, the commands would be received and stored, and a timing signal initiated to control a programmed delay based on the most up to date commands from the central processor. Each controller may receive real time updates generated by the central processor during the event. If communication is lost, then the controller would initiate the pretensioning command based on the most recently received amplitude and timing information.

Apparatus and associated methods relate to an Aircraft Passenger Restraint System (APRS) incorporated into a seat, with a pretensioner in conjunction with an integral retractable shoulder and seat belt webbing (three-point restraint) that, during a deceleration event, instantly retracts the belt webbing to remove any slack between the seat occupant and the webbing, the system adapted for obliquely-oriented aircraft passenger seats, and designed to control a seat occupant's upper body, head and torso area, the system further employed to control the forces on the seat occupant's lower spine and lower torso and employed to control the Head Injury Criteria (HIC) levels for the seat occupant's head, as well as the neck twist and upper spinal forces, to meet aircraft certification requirements imposed by the Federal Aviation Administration (FAA) and/or the European Aviation Safety Agency (EASA).

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

We claim:

1. An aircraft passenger seat system comprising:
a seat frame comprising a base adapted for attachment to a floor of a passenger cabin of an aircraft at an angle relative to the longitudinal axis of the aircraft, a seat bottom supported by the base, and a seat back, wherein the angle is between 10 degrees and 80 degrees;
a lap belt attached to the seat frame and adapted to extend from one side of the seat bottom to the other side for providing restraint to the abdominal region of a seat occupant;
a shoulder belt mounted on the seat frame and adapted to extend diagonally across the upper torso of the seat occupant, the shoulder belt configured for releasable attachment to the lap belt by the occupant;
a belt retractor mounted rigidly relative to the seat frame, wherein the retractor is connected to the shoulder belt for applying a retracting force to the shoulder belt, and wherein the retractor includes a pretensioner configured to retract the shoulder belt in response to the receipt of a signal associated with an emergency deceleration condition; and
at least one sensor configured to detect a recline angle between the seat back and the seat bottom and generate a recline angle signal representing the detected recline angle;
wherein the signal associated with the emergency deceleration condition includes a pretensioning command signal from a control circuit configured to receive the recline angle signal, control the pretensioner based in part on the detected recline angle, and adjust an amplitude of the pretensioning command signal based on the recline angle signal, and
wherein the pretensioner activates retraction of the shoulder belt responsive to the command signal.

2. The system of claim 1, wherein the pretensioning command signal is generated in response to a predetermined deceleration profile of the aircraft.

3. The system of claim 1, wherein the control circuit is further configured to adjust a timing of the pretensioning command signal based on the recline angle signal.

4. The system of claim 1, wherein the angle is between about 15 degrees and about 45 degrees.

5. The system of claim 1, wherein the seat is oriented to face rearward in the passenger cabin of the aircraft.

6. The system of claim 1, further comprising a slot formed in an upper portion of the seat back, wherein the shoulder belt passes through the slot and the slot comprises a low friction guide channel to separate the webbing from an inner edge of the slot.

7. The system of claim 6, further comprising a roller having an axis of rotation parallel to a major dimension of the slot, wherein the roller is arranged in the slot to separate the webbing from an inner edge of the slot.

8. An aircraft passenger seat system comprising:
a three-point harness for installation on a passenger seat in a passenger cabin of an aircraft, comprising a lap belt configured for attachment to a seat frame of the passenger seat and adapted to extend from one side of a seat bottom of the passenger seat to the other side, a shoulder belt configured for mounting to a seat back of the passenger seat and adapted to extend diagonally across the upper torso of the seat occupant for releasable attachment to the lap belt, and a pretensioner operatively connected to the shoulder belt for applying a retracting force to the shoulder belt;
at least one sensor configured to detect a recline angle between the seat back and seat bottom and generate a recline angle signal representing the detected recline angle;
at least one sensor configured to detect a size characteristic of a seat occupant of the passenger seat and to generate a size signal representing the size of the seat occupant; and
processing circuitry configured to identify a rapid deceleration event and issue a command signal to the pretensioner responsive to the rapid deceleration event;
wherein the processing circuitry is configured to receive the size signal and the recline angle signal and adjust the command signal according to a predetermined function of each of the size signal and the recline angle signal, and
wherein the pretensioner activates retraction of the shoulder belt responsive to the command signal.

9. The system of claim 8, further comprising at least one sensor configured to detect a body position of the seat occupant, and to generate a body position signal representing the body position of the seat occupant, wherein the processing circuitry is configured to receive the body position signal and adjust the command signal according to a predetermined function of the body position signal.

10. The system of claim 8, wherein the pretensioner comprises an initiator for igniting a pyrotechnic substance which generates a propellant when ignited, initiating retraction of the shoulder belt.

11. The system of claim 8, wherein the pretensioner comprises a micro-gas generator for generating the propellant.

12. The system of claim 8, wherein the pretensioner comprises a plurality of ball bearings and a rotating race configured, upon release of the ball bearings into the rotating race, for retracting the shoulder belt.

13. The system of claim 12, wherein the rotating race comprises a cog wheel.

14. The system of claim 8, wherein the pretensioner is configured to increase tension of the shoulder belt.

* * * * *